(12) United States Patent
Shen

(10) Patent No.: US 10,564,892 B2
(45) Date of Patent: Feb. 18, 2020

(54) STORAGE DEVICE, ACCESSING SYSTEM AND ACCESSING METHOD

(71) Applicant: Silicon Motion, Inc., Jhubei, Hsinchu County (TW)

(72) Inventor: Chang-Wei Shen, Taoyuan (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 0 days.

(21) Appl. No.: 15/868,600

(22) Filed: Jan. 11, 2018

(65) Prior Publication Data

US 2018/0314464 A1 Nov. 1, 2018

(30) Foreign Application Priority Data

Apr. 28, 2017 (TW) .............................. 106114261 A

(51) Int. Cl.
*G06F 3/06* (2006.01)

(52) U.S. Cl.
CPC .......... *G06F 3/0659* (2013.01); *G06F 3/0604* (2013.01); *G06F 3/068* (2013.01); *G06F 3/0616* (2013.01); *G06F 3/0652* (2013.01); *G06F 3/0679* (2013.01)

(58) Field of Classification Search
CPC .... G06F 3/0659; G06F 3/0604; G06F 3/0652; G06F 3/068
See application file for complete search history.

(56) References Cited

U.S. PATENT DOCUMENTS

| | | | |
|---|---|---|---|
| 2005/0024968 A1* | 2/2005 | Lee | G11C 16/30 365/218 |
| 2010/0306518 A1* | 12/2010 | Suryawanshi | G06F 1/24 713/1 |
| 2013/0159775 A1* | 6/2013 | Balkan | G06F 11/3656 714/34 |
| 2014/0297936 A1 | 10/2014 | Yu et al. | |
| 2014/0351056 A1* | 11/2014 | Codato | G06F 11/0742 705/14.64 |
| 2016/0170831 A1 | 6/2016 | Lesartre et al. | |

* cited by examiner

*Primary Examiner* — Eric Cardwell
(74) *Attorney, Agent, or Firm* — McClure, Qualey & Rodack, LLP

(57) ABSTRACT

A storage device including a volatile memory, a non-volatile memory and a controller is provided. The controller sends a plurality of commands to the non-volatile memory. When the controller receives a reset signal, the controller determines whether a specific operation has been completed. When the controller has not yet finished the specific operation, the controller continuously provides the commands to the non-volatile memory. When the controller has finished the specific operation, the controller performs a reset operation according to the reset signal.

19 Claims, 3 Drawing Sheets

STORAGE DEVICE, ACCESSING SYSTEM AND ACCESSING METHOD

CROSS REFERENCE TO RELATED APPLICATIONS

This Application claims priority of Taiwan Patent Application No. 106114261, filed on Apr. 28, 2017, the entirety of which is incorporated by reference herein.

BACKGROUND OF THE INVENTION

Field of the Invention

The invention relates to an electronic device, and more particularly to a storage device.

Description of the Related Art

In recent years, non-volatile memories, such as flash, are rapidly being developed and applied in various electronic devices. At present, non-volatile memories will continue to be developed in terms of capacity and technique of operation. When a large amount of data is stored in a non-volatile memory, it becomes more important to provide an effective and reliable storage device.

BRIEF SUMMARY OF THE INVENTION

In accordance with an embodiment, a storage device comprises a volatile memory, a non-volatile memory and a controller. The controller sends a plurality of commands to the non-volatile memory. When the controller receives a reset signal, the controller determines whether a specific operation has been completed. When the controller has not yet completed the specific operation, the controller continuously provides the commands to the non-volatile memory. When the controller has completed the specific operation, the controller performs a reset operation according to the reset signal.

In accordance with another embodiment, an accessing system comprises a host and a storage device. The host is configured to provide a reset signal. The storage device receives the reset signal and comprises a volatile memory, a non-volatile memory and a controller. The controller sends a plurality of commands to the non-volatile memory. When the controller receives the reset signal, the controller determines whether a specific operation has finished. When the controller has not yet finished the specific operation, the controller continuously transmits the commands to the non-volatile memory. When the controller has finished the specific operation, the controller performs a reset operation according to the reset signal.

An exemplary embodiment of an accessing method for a storage device comprising a volatile memory and a non-volatile memory is described in the following. A reset signal is received. The non-volatile memory is determined whether to receive a command. When the non-volatile memory is receiving the command, a determination is made as to whether a specific operation has been completed. When the specific operation has not yet completed, the command is continuously transmitted to the non-volatile memory. When the specific operation has been completed, a reset operation is performed.

Accessing methods may be practiced by the accessing systems which have hardware or firmware capable of performing particular functions and may take the form of program code embodied in a tangible media. When the program code is loaded into and executed by an electronic device, a processor, a computer or a machine, the electronic device, the processor, the computer or the machine becomes an apparatus for practicing the disclosed method.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

Figure 1:
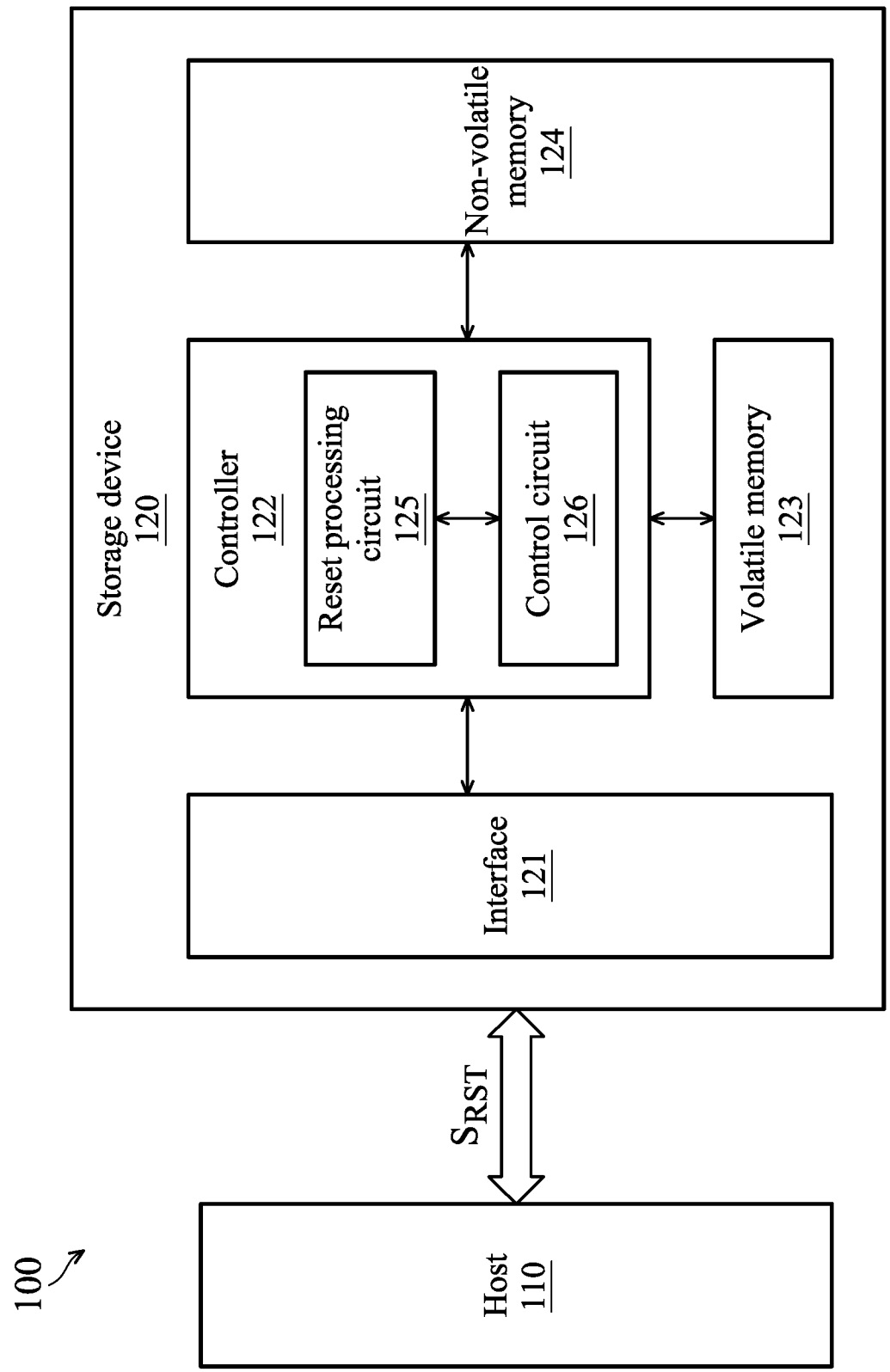
FIG. 1 is a schematic diagram of an exemplary embodiment of an accessing system, according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of an accessing system, according to various aspects of the present disclosure. The accessing system 100 comprises a host 110 and a storage device 120. The host 110 is configured to access the storage device 120. For example, during a write period, the host 110 sends a read command to write external data to the storage device 120. During a read period, the host 110 sends a read command to read the data stored in the storage device 120. In other embodiments, the host 110 sends a reset signal SRST to initialize the storage device 120. The invention does not limit the type of storage device 120. In one embodiment, the storage device 120 matches an embedded MultiMediaCard (eMMC) specification or matches a universal flash storage (UFS) specification.

In this embodiment, the storage device 120 comprises an interface 121, a controller 122, a volatile memory 123 and a non-volatile memory 124. The interface 121 is coupled between the host 110 and the controller 122 to transmit information from the host to the controller 122 or to transmit information from the controller 122 to the host 110. The invention does not limit the type of interface 121. The interface 121 may be a parallel interface or a serial interface.

The controller 122 accesses at least one of the volatile memory 123 and the non-volatile memory 124 according to the commands sent from the host 110. In this embodiment, when the host 110 sends the reset signal $S_{RST}$ to the storage device 120, if the controller 122 is transmitting commands to the non-volatile memory 124, the controller 122 does not perform a reset operation provisionally. In this case, the controller 122 determines whether a specific operation has finished. When the controller 122 has not yet finished the specific operation, the controller 122 continuously transmits commands to the non-volatile memory 124 until the specific operation is finished. When the controller 122 has finished the specific operation, the controller 122 performs a reset operation according to the reset signal $S_{RST}$.

For example, the controller 122 desires to send 100 commands to the non-volatile memory 124 according to an operation (e.g. a read operation, a write operation or a set operation), wherein each command has 32 bits. Assume that the host 110 sends the reset signal $S_{RST}$ and the controller 122 has provided the first sixteen bits of the 50$^{th}$ command among the 100 commands to the non-volatile memory 124. Since the controller 122 does not provide the last sixteen bits (e.g. the 17$^{th}$ bit to the 32$^{th}$ bit) to the non-volatile memory 124, the non-volatile memory 124 has not received all bits of the 50$^{th}$ command completely. At this time, if the controller 122 directly performs a reset operation according to the reset signal $S_{RST}$, the non-volatile memory 124 may be damaged and cannot access data.

Therefore, in this embodiment, when the controller 122 receives the reset signal $S_{RST}$, if the controller 122 is transmitting a command to the non-volatile memory 124, the controller 122 determines whether a specific operation has been completed. When the controller 122 has not yet finished the specific operation, the controller 122 continuously transmits the command to the non-volatile memory 124. When the controller 122 has finished the specific operation, the controller 122 performs a reset operation according to the reset signal $S_{RST}$. For example, after the controller 122 has provided the 17$^{th}$-32$^{th}$ bits of the 50$^{th}$ command to the non-volatile memory 124, the controller 122 starts performing a reset operation. In this case, the specific operation is that the controller 122 has transmitted all bits of a command (e.g. the 50$^{th}$ command) to the non-volatile memory 124, wherein while the controller 122 receives the reset signal $S_{RST}$, the controller 122 is transmitting the command to the non-volatile memory 124.

In another embodiment, the specific operation is that the controller 122 has transmitted all commands to the non-volatile memory 124. For example, assume that the controller 122 desires to transmit a hundred commands to the non-volatile memory 124 for a single operation. In this case, after the controller 122 has transmitted the hundred commands to the non-volatile memory 124, the controller 122 starts performing a reset operation. In other embodiments, when the controller 122 has not finished the specific operation during a predetermined period, it means that the controller 122 or the non-volatile memory 124 is abnormal. Therefore, the controller 122 stops transmitting any command to the non-volatile memory 124 and directly performs a reset operation.

In this embodiment, the controller 122 comprises a reset processing circuit 125 and a control circuit 126. When the reset processing circuit 125 utilizes the interface 121 to determine that the host 110 outputs the reset signal $S_{RST}$, the reset processing circuit 125 changes the value of a reset register. In one embodiment, the reset register may be disposed in the reset processing circuit 125, the control circuit 126, the volatile memory 123 or the 124. In another embodiment, the reset processing circuit 125 further comprises a counter (not shown). When the value of the counter reaches a predetermined value, the reset processing circuit 125 triggers the control circuit 126. In other embodiments, the counter is disposed in the control circuit 126.

The control circuit 126 is configured to access the volatile memory 123 and the non-volatile memory 124. In one embodiment, after the control circuit 126 finishes a specific operation, the control circuit 126 reads the value of a reset register to determine whether the reset signal $S_{RST}$ is sent from the host 110. In some embodiments, after the reset processing circuit 125 receives the reset signal $S_{RST}$, the reset processing circuit 125 triggers a counter (not shown). When the value of the counter reaches a predetermined value, the reset processing circuit 125 sends a trigger signal to direct the control circuit 126 to perform a reset operation immediately. In this case, even if the control circuit 126 has not finished the specific operation, the control circuit 126 directly performs a reset operation.

Figure 2:
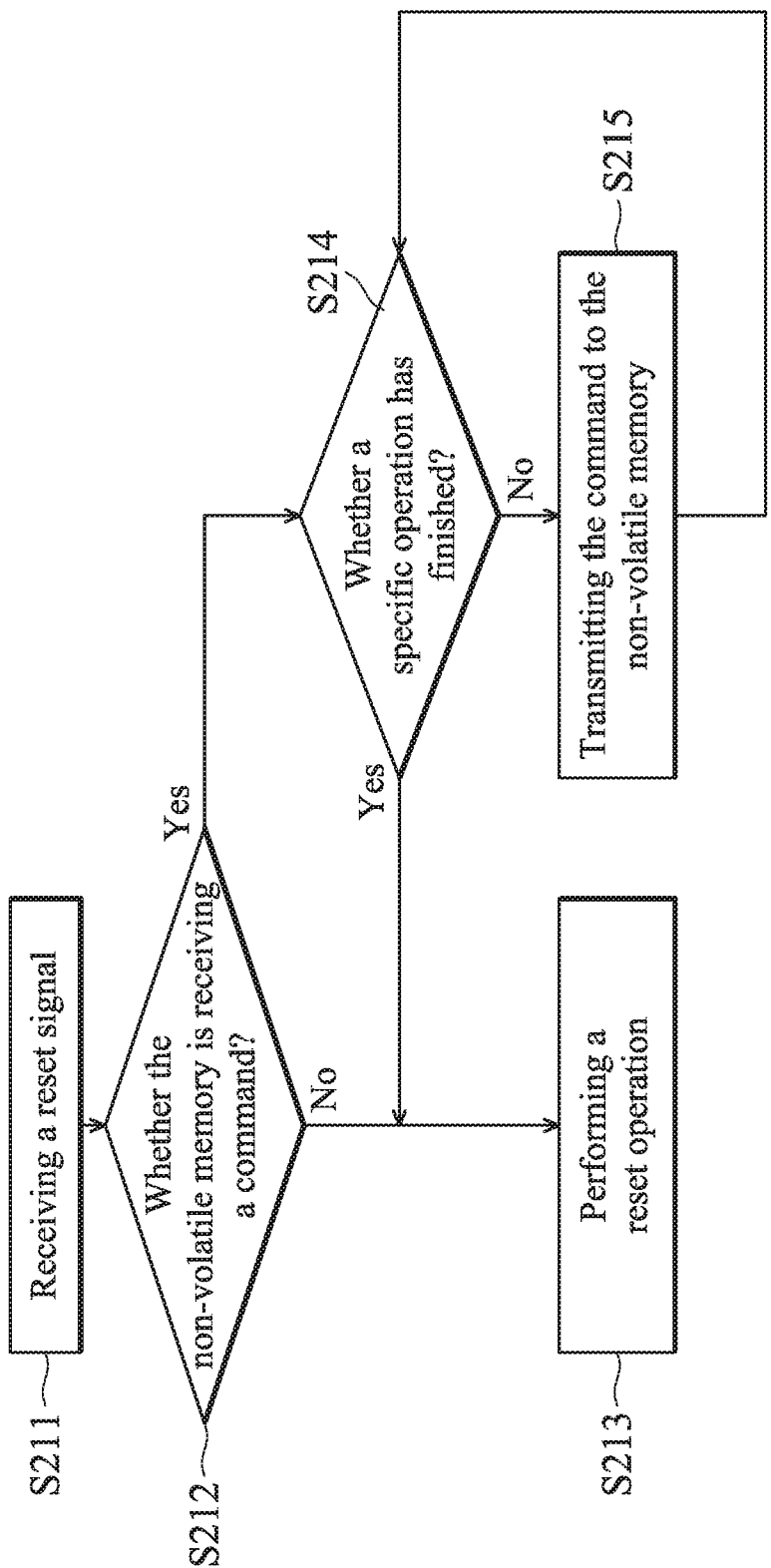
FIG. 2 is a flowchart of an exemplary embodiment of an accessing method, according to various aspects of the present disclosure.

FIG. 2 is a flowchart of an exemplary embodiment of an accessing method, according to various aspects of the present disclosure. The accessing method is applied to a storage device. The storage device comprises a non-volatile memory and a volatile memory. First, a reset signal is received (step S211). In one embodiment, when the storage device receives the reset signal, a controller of the storage device changes the value of a reset register. The reset register may be disposed in the non-volatile memory, the volatile memory or the controller of the storage device. In this embodiment, the controller is configured to access the non-volatile memory and the volatile memory.

Next, step S212 determines whether the non-volatile memory is receiving a command. In one embodiment, the controller executes step S212. When the non-volatile memory does not receive the command, a reset operation is performed immediately (step S213). In one embodiment, the reset operation is to initialize the internal registers disposed in at least one of the controller, the volatile memory and the non-volatile memory. In other embodiments, step S213 is executed by the controller.

However, when the non-volatile memory is receiving the command, a determination is made as to whether a specific operation has finished (step S214). In one embodiment, the controller determines whether the specific operation has finished. When the controller has finished the specific operation, a reset operation is performed (step S213). However, when the specific operation has not finished, the non-volatile memory continuously receives the command (step S215) and step S214 is executed to determine whether the specific operation has finished.

In one embodiment, the specific operation is that the controller has provided many commands to the non-volatile memory, wherein the number of the commands provided from the controller is equal to a specific value. For example, assume that the controller desires to provide 100 commands to the non-volatile memory in a single write operation or in a single read operation. In this case, when the controller has provided the 100 commands to the non-volatile memory, it means that the specific operation has finished. In another embodiment, the specific operation is that the controller has provided all bits of a command to the non-volatile memory, wherein when the storage device receives the reset signal, the non-volatile memory is receiving the command.

Figure 3:
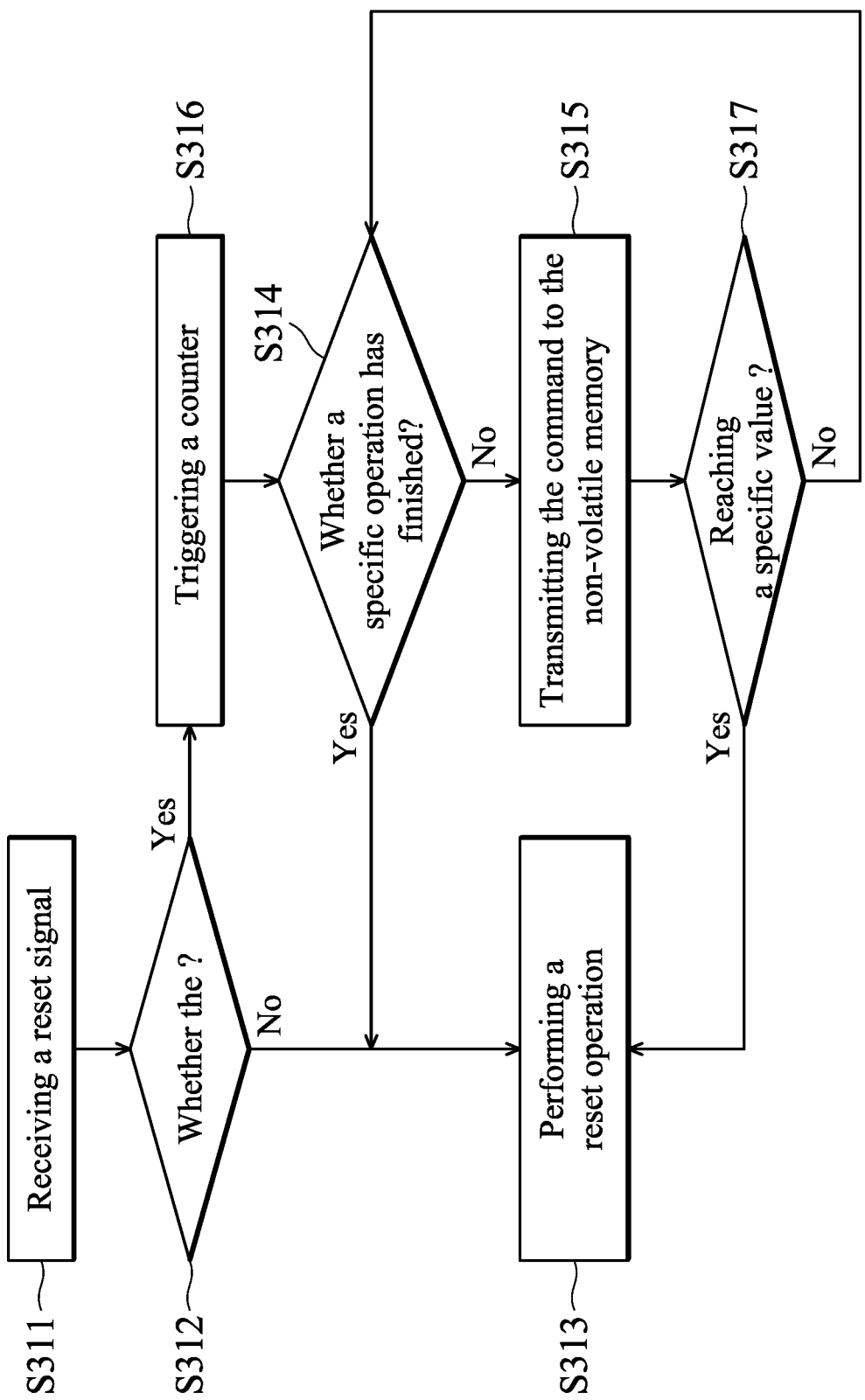
FIG. 3 is a flowchart of another exemplary embodiment of an accessing method, according to various aspects of the present disclosure.

FIG. 3 is a flowchart of another exemplary embodiment of non-volatile memory accessing method, according to various aspects of the present disclosure. FIG. 3 is similar to FIG. 2 exception that the accessing method shown in FIG. 3 further comprises steps S316 and S317. Since the features of steps S311~S315 shown in FIG. 3 are the same as the features of steps S211~S215 shown in FIG. 2, the descriptions of the features of steps S311~S315 shown in FIG. 3 are omitted. In this embodiment, after receiving the reset signal, a determination is made as to whether the non-volatile memory is receiving the command (step S312). If the non-volatile memory is receiving the command, a counter is triggered (step S316). In one embodiment, the counter is disposed in the controller, the non-volatile memory or the volatile memory of the storage device.

When a specific operation has not been completed, the non-volatile memory continuously receives the command (step S315) and a determination is made as to whether the value of the counter has reached a specific value (step S317). When the value of the counter has not reached the specific value, step S314 is executed to determine whether the specific operation has been completed. However, when the value of the counter has reached the specific value, the reset operation is performed to initialize the storage device (step S313).

The storage device does not perform the reset operation immediately to avoid damaging the non-volatile memory because the non-volatile memory has not received the command completely. Furthermore, when the storage device cannot finish the specific operation during a specific period, it means that internal elements disposed in the storage device may have failed. Therefore, a reset operation is performed immediately to eliminate the abnormal situation in the storage device.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. A storage device, comprising:
   a volatile memory;
   a non-volatile memory; and
   a controller sending a plurality of commands to the non-volatile memory and comprising a reset processing circuit and a control circuit,
   wherein when the controller receives a reset signal, the controller determines whether a specific operation has been completed, and when the controller has not yet completed the specific operation, the controller continuously provides the commands to the non-volatile memory, and when the controller has completed the specific operation, the controller performs a reset operation according to the reset signal, and
   wherein responsive to the controller receiving the reset signal and the non-volatile memory not receiving the commands, the controller performs the reset operation immediately,
   responsive to the reset processing circuit receiving the reset signal, the reset processing circuit triggers a counter,
   responsive to a count value of the counter not reaching a predetermined value and the specific operation not being completed, the control circuit does not perform the reset operation, and
   responsive to the count value of the counter reaches the predetermined value, the reset processing circuit directs the control circuit to perform the reset operation immediately.

2. The storage device as claimed in claim 1, wherein when the controller receives the reset signal, the controller changes a value of a reset register.

3. The storage device as claimed in claim 2, wherein the reset register is disposed in the volatile memory.

4. The storage device as claimed in claim 1, wherein the reset operation is to reset at least one of the volatile memory and the non-volatile memory.

5. The storage device as claimed in claim 1, wherein the specific operation is that the controller has transmitted all of the commands to the non-volatile memory.

6. The storage device as claimed in claim 1, wherein when the controller receives the reset signal and the controller is transmitting a specific command among the commands to the non-volatile memory, the specific operation is that the controller has transmitted all bits of the specific command to the non-volatile memory.

7. The storage device as claimed in claim 1, wherein when the controller has not completed the specific operation during a predetermined period, the controller performs the reset operation.

8. An accessing system comprising:
   a host configured to provide a reset signal; and
   a storage device receiving the reset signal and comprising:
   a volatile memory;
   a non-volatile memory; and
   a controller sending a plurality of commands to the non-volatile memory and comprising a reset processing circuit and a control circuit,
   wherein when the controller receives the reset signal, the controller determines whether a specific operation has finished,
   wherein when the controller has not finished the specific operation, the controller continuously transmits the commands to the non-volatile memory, and when the controller has finished the specific operation, the controller performs a reset operation according to the reset signal, and
   wherein responsive to the controller receiving the reset signal and the non-volatile memory not receiving the commands, the controller performs the reset operation immediately,
   responsive to the reset processing circuit receiving the reset signal, the reset processing circuit triggers a counter,
   responsive to a count value of the counter not reaching a predetermined value and the specific operation not being completed, the control circuit does not perform the reset operation, and
   responsive to the count value of the counter reaches the predetermined value, the reset processing circuit directs the control circuit to perform the reset operation immediately.

9. The accessing system as claimed in claim 8, wherein when the controller receives the reset signal, the controller changes a value of a reset register.

10. The accessing system as claimed in claim 9, wherein the reset register is disposed in the volatile memory.

11. The accessing system as claimed in claim 8, wherein the reset operation is to reset at least one of the volatile memory and the non-volatile memory.

12. The accessing system as claimed in claim 8, wherein the specific operation is that the controller has transmitted all of the commands to the non-volatile memory.

13. The accessing system as claimed in claim 8, wherein when the controller receives the reset signal and the controller is transmitting a specific command to the non-volatile memory, the specific operation is that the controller has transmitted all bits of the specific command to the non-volatile memory.

14. The accessing system as claimed in claim 8, wherein when the controller has not finished the specific operation during a predetermined period, the controller performs the reset operation.

15. The accessing system as claimed in claim 8, wherein the host is disposed outside of the storage device.

16. An accessing method for a storage device, which comprises a volatile memory and a non-volatile memory, comprising:
   receiving a reset signal;
   determining whether the non-volatile memory is receiving a command;
   activating a counter and determining whether a specific operation has finished when the non-volatile memory is receiving the command;
   continuously transmitting the command to the non-volatile memory when the specific operation has not finished; and
   performing a reset operation when the specific operation has finished,
   wherein responsive to the reset signal being received and the non-volatile memory not receiving the command, the reset operation being immediately performed,
   responsive to a count value of the counter not reaching a predetermined value and the specific operation not being finished, the reset operation is not performed, and
   responsive to the count value of the counter reaches the predetermined value, the reset operation is immediately performed.

17. The accessing method as claimed in claim 16, wherein the reset operation is to reset at least one of the volatile memory and the non-volatile memory.

18. The accessing method as claimed in claim 16, wherein the specific operation is that the non-volatile memory has received a plurality of commands, and a number of the commands received by the non-volatile memory is equal to a specific value.

19. The accessing method as claimed in claim 16, wherein the specific operation is that all bits of the command have been transmitted to the non-volatile memory.

* * * * *